Patented Mar. 11, 1924.

1,486,297

UNITED STATES PATENT OFFICE.

ROLLIN A. PALLANCH, OF VICTOR, COLORADO, ASSIGNOR, BY MESNE ASSIGNMENTS, TO METALS RECOVERY COMPANY, OF NEW YORK, N. Y., A CORPORATION OF MAINE.

PROCESS FOR CONCENTRATING MIXED SULPHIDE ORES.

No Drawing.    Application filed July 7, 1922. Serial No. 573,436.

*To all whom it may concern:*

Be it known that I, ROLLIN A. PALLANCH, a citizen of the United States, residing at Victor, in the county of Teller and State of Colorado, have invented certain new and useful Improvements in Processes for Concentrating Mixed Sulphide Ores; and I do hereby declare the following to be a full, clear, and exact description of the invention, such as will enable others skilled in the art to which it appertains to make and use the same.

The invention relates to the separation of mixed sulphide ores by flotation, and more particularly to a differential flotation process by which certain sulphides such as lead sulphides may be economically and efficiently separated from other sulphides such as zinc sulphides of mixed ores containing these sulphides.

The process is based on the discovery that a highly effective differential flotation of lead sulphide from a complex sulphide ore may be secured by subjecting a pulp of such ore to flotation separation in the presence of a small quantity of an alkaline sulfite such as sodium or calcium sulfite.

The sulfite may be added as such to the mill water or to the pulp or it may be produced in the pulp by adding a hydrate or carbonate of an alkali or alkaline earth metal and then passing in sulphur dioxide gas which unites with the hydrate or carbonate to form the sulfite in the pulp. In case the sulfite is added to the mill water or pulp the pulp will be substantially neutral before and after the addition of the sulfite and during the differential flotation and removal of the lead sulphide. In case a hydrate or carbonate of an alkali or alkaline earth metal is added to the pulp or mill water and the sulfite produced by thereafter passing in sulphur dioxide gas it has been found that an excess of the alkaline compound sufficient to make the pulp alkaline does not have any harmful effect on the differential flotation of the lead sulphide.

It is preferred to add calcium sulfite to the mill water or the ore pulp before the addition of the frothing agent to the pulp. In this case, as above stated, the pulp is substantially neutral before and after the addition of the sulfite and during the removal of the lead sulphide. After the lead sulphide has been removed flotation of the zinc sulphide may be effected by adding to the pulp a reagent such, for instance, as sulphuric acid for the purpose of destroying the inhibitory influence of the sulfite on the zinc sulphide and thus restore this mineral to its natural inclination and ability to float when the pulp is subjected to flotation. An additional amount of the frothing agent may also be added if necessary.

The amount of sulfite required to secure an efficient differential flotation of the lead sulphide will depend upon the character of the ore being treated and also upon the character of the mill water used. In treating the mixed sulphide ores of the Bingham district for example it has been found that two pounds of calcium sulfite per ton of ore is sufficient to secure the differential flotation of the lead sulphide and that the addition of 5 pounds of sulphuric acid per ton of ore to the pulp remaining after the lead sulphide has been removed is sufficient to secure the flotation and separation of the zinc sulphide.

The term "ore" herein is intended to include concentrates, tailings, slimes and other products containing mixed lead and zinc sulphides.

What is claimed is:

A process for separating lead sulphide from zinc sulphide in ores containing mixed lead and zinc sulphides which consists in submitting such ore to flotation separation in the presence of calcium sulfite to obtain a float concentrate of lead sulphide.

ROLLIN A. PALLANCH.